(12) United States Patent
Scherer et al.

(10) Patent No.: US 7,905,520 B2
(45) Date of Patent: Mar. 15, 2011

(54) HOSE CONNECTING DEVICE

(75) Inventors: Eric Scherer, Otigheim (DE); Peter Ernst, Rheinmunster-Stollhofen (DE); Jurgen Schmidt, Rastatt (DE)

(73) Assignee: Eaton Fluid Power GmbH, Baden-Baden (DE)

( * ) Notice: Subject to any disclaimer, the term of this patent is extended or adjusted under 35 U.S.C. 154(b) by 270 days.

(21) Appl. No.: 11/664,868

(22) PCT Filed: Oct. 7, 2005

(86) PCT No.: PCT/EP2005/010803
§ 371 (c)(1),
(2), (4) Date: May 1, 2008

(87) PCT Pub. No.: WO2006/040082
PCT Pub. Date: Apr. 20, 2006

(65) Prior Publication Data
US 2008/0252072 A1    Oct. 16, 2008

(30) Foreign Application Priority Data
Oct. 8, 2004   (DE) .......................... 10 2004 049 449

(51) Int. Cl.
*F16L 33/00* (2006.01)
(52) U.S. Cl. ........................................ 285/252; 285/254
(58) Field of Classification Search .................. 285/242, 285/243, 244, 252, 254, 257
See application file for complete search history.

(56) References Cited

U.S. PATENT DOCUMENTS

| 1,720,781 | A |   | 7/1929 | Deakins |          |
|-----------|---|---|--------|---------|----------|
| 3,574,355 | A | * | 4/1971 | Oetiker | 285/39 |
| 6,010,162 | A | * | 1/2000 | Grau et al. | 285/257 |
| 2004/0222631 | A1 | * | 11/2004 | Baxi et al. | 285/252 |

FOREIGN PATENT DOCUMENTS

| DE | 4329650 A1 | 3/1995 |
| FR | 1227889   | 8/1960 |
| FR | 1314716   | 1/1963 |

OTHER PUBLICATIONS

International Search Report for Application No. PCT/EP2005/010803, mailed Oct. 4, 2006.
Written Opinion of the International Search Authority for Application No. PCT/EP/2005/010803, mailed Oct. 4, 2006. One page computer-generated translation of Part V attached.

* cited by examiner

*Primary Examiner* — James M Hewitt
*Assistant Examiner* — Gwendolyn D Fournet
(74) *Attorney, Agent, or Firm* — Dykema Gossett PLLC

(57) ABSTRACT

A hose connecting device that is suitable for high-pressure applications includes a retainer for connecting a hose end to a hose connecting device element. The retainer may be secured or anchored to a flange of the hose connecting device element. In an embodiment, the retainer includes at least two retaining limbs that are secured on the outside of the hose by a tension device, such as by tightening straps. The retaining limbs may be provided between the outside of the hose and the tension device, and may be clamped therein. In an embodiment, the retaining limbs include recesses with flanges or stepped edges to support the limbs. In an embodiment, tightening straps may dig into the outside of the hose and rest against the hose.

18 Claims, 1 Drawing Sheet

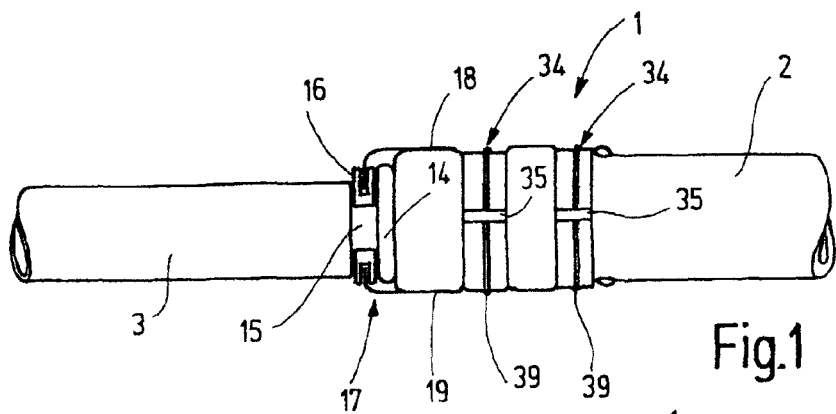
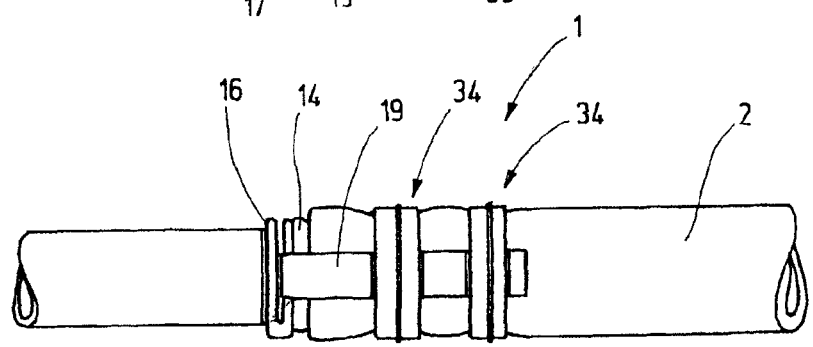
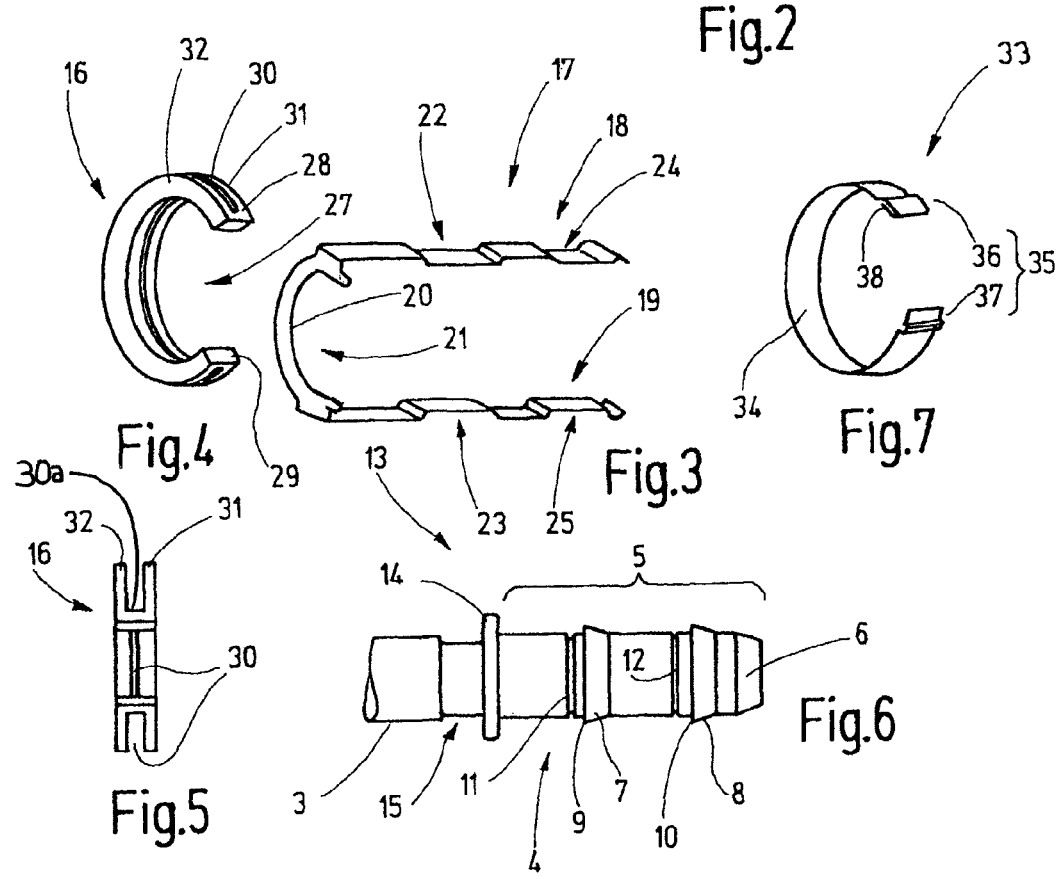

HOSE CONNECTING DEVICE

The invention relates to a connecting device for connecting hoses to connecting nipples, pipe ends and the like.

In many technical fields, for example, referring to hydraulic systems, air-conditioning systems, heating systems, automobile technology, etc., fluid-tight durable tight connections must be established between hose lines and conduits or assemblies or other component modules connected thereto. In so doing, the safety of the connection, the long-term seal with respect to fluid flowing in the conduit or the hose, the assembly reliability and the simplicity of producing such a connection are of particular importance.

From Utility Model No. 7314756 it has been known to secure a hose containing an internal corrugated pipe on an appropriate nipple fitting into the corrugated pipe by using a crimping sleeve. This crimping sleeve is slipped onto a section of the corrugated pipe which is not provided with the external hose coating.

Likewise, DE-OS 3808383 illustrates securing of a hose end on an appropriate nipple by means of a crimping sleeve. This crimping sleeve is secured by an inward-facing edge in an appropriate annular groove of the connecting nipple and reaches around an associate flange. In so doing, the crimping sleeve must either be slipped over the connecting nipple in axial direction from the side facing away from the hose, or the inward-facing edge may be formed only during a reforming operation, after the sleeve that previously did not have an inward-facing edge has been slipped over the hose and over the nipple.

Both of these features represent significant restrictions regarding assembly options.

Referring to this, it is the object of the invention to provide a hose connecting device, which is easy to achieve and is secure for a long time and which is used to connect a hose.

This and other objectives may be achieved with embodiments of hose connecting devices provided in accordance with teachings of this disclosure.

The hose connecting device in accordance with the invention comprises a hose connecting device element that has a hose receiving section and, adjoining thereto, a radial projection. The hose connecting device element, for example, may be an appropriately profiled conduit end of a conduit consisting of metal, a conduit consisting of plastic material or a connecting nipple that is provided with other connecting means such as engagement devices or threads in order to be connected to a coupling piece, a unit such as, for example an air-conditioning compressor or the like. It may also itself be configured as a coupling piece that forms one coupling half of a plug-in coupling.

The hose receiving section of the hose connecting device element can be inserted in a hose, in which case the inner hose abuts slightly tensioned against the outside of the hose receiving section. The hose connecting device element is secured to the hose by a retainer and a tensions means. The retainer is attached to the hose connecting device element and is directly supported, or preferably indirectly supported, on the radial projection. The retainer has two longitudinal retaining limbs extending essentially parallel to each other. When installed, they are essentially in parallel alignment with the hose connecting device element. Preferably, the retaining limbs abut against the outside of the hose. With the use of tension means that extend around the retaining limbs and the outside of the hose, the retaining limbs a clamped against the outside of the hose and thus press the hose against the outside of the hose receiving section. In so doing, the form closure and the frictional contact existing between the hose connecting device element and the inside of the inner hose are reinforced. However, a critical feature of the retainer is that said retainer is supported by a strip, directly or indirectly, on the radial extension of the hose connection element. This ensures that the hose connecting device element cannot slip out of the hose end. The retaining limbs of the retainer are retained by the tension means on the outside of the hose. Preferably, the retaining limbs are provided with one or more bends, so that they are in form-closed engagement with the tension means. This form-closure prevents the retaining limbs from slipping out from under the tension means when subjected to axial tensile loading.

The hose receiving section preferably has a tubular configuration, in which case this, in turn has a preferably round cross-section. If necessary, it may be smooth on its outside. Preferably, however, the outside is provided with a profile, i.e., a hose holding profile. This contributes to the axial securing of the hose on the hose connecting device element.

The hose holding profile may have the form of one or more annular ribs, which, in turn, may have one or more edges facing against the hose pull-off direction. In addition, the outside of the hose receiving section may be provided with at least one or more annular grooves for the accommodation of a sealing element in order to improve or ensure the seal between the hose and the hose connecting device element. The hose connecting device element may be an O-ring. The radial projection, for example, may have the configuration of a radial flange. The most preferred embodiment is a circumferentially provided disk flange. The retainer is supported thereon, either indirectly via a holder or directly. Next to the radial projection may be a groove for the accommodation of the holder which, in turn, receives the strip of the retainer and is supported on the radial projection.

The form of the connection element described so far can be created in a combined crimping and rolling operation, i.e., by means of a reforming process that requires either no cutting at all or at least requires mostly no cutting. This offers the advantage that no weak points are created along the hose connecting device element, which said weak points could act as the starts of a tear.

Preferably, the mentioned holder is made of a plastic component that can be laterally slipped onto the hose connecting device element. Referring to the front view, this element has is a C-shaped element, for example. Furthermore, it has resilient extensions which can be slipped over the provided annular groove region of the hose connecting device element. In so doing, said element's limbs are spread in an elastic manner and snap together again, as a result of which the holder is held in engagement. Said holder may have a slit for the accommodation of the strip of the retainer. The slit extends in circumferential direction over the outside of the holder. The slit may have a bottom or be continuous in radial direction, i.e., be configured without a bottom. An interrupted bottom is also possible. Preferably, the holder is a plastic element, for example, a molded plastic element. However, it is also possible to use a bent metal part, which, for example, has been produced by centrally folding a stamped part of sheet metal.

The tension means, for example, may be a tightening strap used for attaching a hose. The tightening strap may be provided with a form-closed tension lock that is brought into engagement with an appropriate tension tool.

Additional details of advantageous embodiments of the invention are the subject matter of the drawing, of the description or of the claims. The drawings show an exemplary embodiment of the invention. They show in FIG. 1 a first side view of an installed hose connecting device;

FIG. 2 a second side view of the hose connecting device in accordance with FIG. 1;

FIG. 3 a separate, perspective illustration of the retainer of the hose connecting device;

FIG. 4 a separate, perspective illustration of the retainer of the tension device in accordance with FIGS. 1 and 2, on a different scale;

FIG. 5 a front view of the retainer in accordance with FIG. 4;

FIG. 6 a separate side view of the hose connecting device element of the hose connecting device; and, FIG. 7 a perspective view of the tightening strap, in open state, associated with the hose connecting device in accordance with FIGS. 1 and 2.

FIG. 1 shows a hose connecting device 1 which is used for the connection of a hose 2 to a conduit 3. The hose 2 and the conduit 3 form a fluid line for a pressurized fluid, whereby the bursting pressure can be, for example, above 100 bar (e.g., 140 bar). The hose connecting device 1 includes, on one end of the conduit 3, an adjoining molded integral hose connecting device element 4, as is separately shown in FIG. 6. As mentioned, the hose connecting device element 4 may form the end of the conduit 3 or be configured as a separate connecting nipple that is provided, referring to FIG. 6, on its left with connection means that are not specifically illustrated, for example a thread or other coupling means.

The hose connecting device element 4 is tubular and comprises a hose receiving section 5. The outside of said latter section is provided with a profile. Considering a cylindrical basic shape, the end has a bezel 6 in order to facilitate insertion of the hose connecting device element 4 in an open hose end. In addition, the outside of the hose connecting device section is provided with one or more annular ribs 7, 8, which have a saw tooth longitudinal section. On their sides facing away from the bezel 6, the ribs 7, 8 are preferably provided with a sharp edge 9, 10. This edge faces against the hose pull-off direction. Adjacent to the ribs 7, 8, if necessary, annular grooves 11, 12, may be provided, which may be used, for example, for the accommodation of a sealing element such as an O-ring.

Adjoining the hose receiving section 5 is a radial projection 13, which, in the present exemplary embodiment, is configured as a radially oriented flange 14, preferably as a disk flange. The latter is preferably produced by means of a crimping process. In the vicinity of the flange 14 is a groove 15 having a preferably cylindrical bottom and being used for the accommodation of the C-shaped holder 16 as shown by FIGS. 4 and 5. The groove 15 terminates the hose connecting device element 4. The conduit 3 continues starting with the groove 15.

As separately shown by FIG. 3, a retainer 17 also belongs to the hose connecting device. The retainer 17 comprises two essentially parallel retaining limbs 18, 19, which, on the opposing sides of the hose 2, abut against the outside of said hose. This is obvious from FIG. 1. The retaining limbs 18, 19 are connected to each other by a strip 20, which encloses a mouth-like opening 21. This opening has a size such that the strip 20 may enclose the conduit 3 or at least the bottom of the groove 15.

The retaining limbs 18, 19 are configured symmetrical with respect to each other. They are bent multiple times, so that each retaining limb 18, 19 has at least one cutout portion 22, 23 and preferably one additional cutout portion 24, 25. Each of these cutout portions 22 through 25 is formed in that the retaining limbs 18 and 19, respectively, are first bent radially inward and then again bent back into their original axial direction of extension. Thus, the cutout portions 22 through 25 form flat grooves or pockets.

The holder 16, which also belongs to the hose connecting device and is shown by FIGS. 4 and 5, is provided for the retainer 17 to be supported on the hose connecting device element 4. This holder 16 preferably is designed as a plastic element. In plan view, it is C-shaped and has two retaining limbs 28, 29 defining between them a gap 27. The holder 16 follows an arc of a circle subtending an angle greater than 180 degrees. Its inside diameter corresponds approximately to the outside diameter of the bottom of the groove 15. Thus, it is seated in an engaged manner in the groove 15, when said holder is slid radially onto the hose connecting device element 4 while the retaining limbs 28, 29 are spread apart in a resilient manner. The gap 27 has appropriate dimensions in order to permit this without damaging the holder 16.

The holder 16 is provided with a slit 30 extending almost around its entire circumference, which slit can have a radially inward bottom (provided at 30a) or, as illustrated by FIG. 4, can be open. Said slit is disposed to accommodate the strip 20 and divides the holder 16 in two parallel and spaced apart C-shaped parts 31, 32, which, respectively, are connected to each other on the free ends of their limbs 28, 29. Referring to this form, the holder 16 can also be manufactured of a bent sheet metal part. Preferably, however, it is a part of plastic material.

Furthermore, the hose connecting device 1, includes a tension means 33 which is disposed to hold the retaining limbs 18, 19 on the outside of the hose 2. In accordance with FIG. 7, the tension means 33 is a tightening strap 34, for example, of steel or of another suitable material. It has a length corresponding to the circumference of the hose 2.

On its free ends, the tightening strap 34 is provided with a tension lock 35 that includes two lock halves 36, 37. They may have the design as shown by FIG. 7. For example, the lock half 37 may be configured as an outward directed bead, whereas the lock half 36 is configured as a notch. This notch leaves open a receiving gap 38 into which fits the bead of the lock half 37. Furthermore, as is obvious from FIGS. 1 and 2, the tightening strap 34 is provided with a stiffening bead 39 extending in circumferential direction.

A method for forming a hose connection employing an embodiment of a hose connecting device disclosed herein is as follows:

First, the open end of the hose 2 is slipped on the hose receiving section 5 of the hose connecting device element 4 or of the conduit 3 until the front side of said hose abuts against the flange 14. Then, the holder 16 is set into the groove 15 in that said holder is laterally snapped on. In this state, the retainer 17 can be applied in that its strip 20 is inserted into the slit 30, in which case both its retaining limbs 18, 19 come to rest on the sides of the hose 2 that are diametrically opposite each other. In so doing, said retaining limbs extend parallel to the longitudinal direction of the hose. Now, a tightening strap 34 is placed into each of the cutout portions 22, 23 and 24, 25 of the retaining limbs 18, 19 and locked with an appropriate collet chuck or another chucking tool. This is achieved by firmly pressing the retaining limbs 18, 19 against the hose 2, as a result of which said hose is compressed and, in turn, pressed firmly against the outside of the hose receiving section 5. As is particularly obvious from FIG. 2, the tightening straps press themselves somewhat into the outside of the hose 2. Consequently, said straps are held on the hose in such a manner that they cannot be shifted in axial direction. Because they are located in the cutout portions 22 through 25, they also hold the retaining limbs 18, 19 in axial direction on the hose 2. In addition, due to the slight deformation of the hose 2, the strip 20 is tensioned with respect to the holder 16 and, consequently, said holder is tensioned against the flange 14. The outward bent ends of the limbs 18, 19 are also pressed into the outside of the hose 2.

By securing the tightening straps 34, the connection is complete. The retainer 17 is supported by the flange 14 via the holder 16 and also prevents the hose 2 from being axially pulled off the hose receiving section 5, as well as prevents the hose receiving section 5 from being axially pushed out of the hose end.

The connection can be produced easily and reliably, while providing a durable seal and featuring multiple uses.

The inventive hose connecting device use a retainer 17 for the attachment of a hose end to a hose connecting device element 4. The retainer 17 anchored to a flange 14 of the hose connecting device element 4 has two retaining limbs 18, 19, which are anchored, by means of tightening straps 34, to the outside of the hose 2. In so doing, the retaining limbs 18, 19 are located between the outside of the hose 2 and the tightening straps 34 and are fastened there by being clamped. In addition, said retaining limbs have cutout portions 22 through 25 having flanks or step-like edges supporting the tightening straps 34 in a form-closed manner. The tightening straps 34 press themselves into the outside of the hose 2 and are thus also seated on the hose in a completely form-closed manner. As a result of this, a connection is obtained which can be produced in an easy, reliable and inexpensive manner between the hose 2 and, for example, a conduit 3.

The invention claimed is:

1. A hose connecting device suitable for high-pressure applications, the device comprising:
    a hose connecting device element having an extension with a hose receiving section for receiving a hose and a radial projection adjoining the hose receiving section;
    a retainer including at least two retaining limbs extending axially on the outside of the hose in longitudinal direction of the hose, the retaining limbs being connected with each other by a strip supported by the radial projection;
    at least one tension device that encloses a portion of the outside of the hose and the retaining limbs in the radial direction and tensions the retaining limbs with respect to the outside of the hose; and
    a c-shaped holder having resilient limbs, the holder forming an arc of a circle;
    wherein, next to the radial projection, a longitudinally-extending groove for the accommodation of the holder is provided, the holder is separate from the retainer and the holder is configured to extend continuously more than 180 degrees around the circumference of the groove, the groove being defined on one side by the radial projection and defined on an opposite side by a conduit portion of the hose connecting device element and configured to accommodate the strip of the retainer and, in turn, a portion of the retainer being supported by the radial projection; and
    wherein the holder has a slit extending along the holder's circumference, the strip of the retainer being inserted into the slit.

2. The hose connecting device of claim 1, wherein the hose receiving section has a tubular configuration.

3. The hose connecting device of claim 1, wherein a portion of the hose receiving section includes a hose holding profile on an outer surface of the hose receiving section.

4. The hose connecting device of claim 3, wherein the hose holding profile has at least one annular rib with an edge facing against the hose pull-off direction.

5. The hose connecting device of claim 1, wherein the hose receiving section includes at least one annular groove for accommodating a sealing element on an outer surface of the hose receiving section.

6. The hose connecting device of claim 1, wherein the radial projection is configured as a radial flange.

7. The hose connecting device of claim 6, wherein the flange is a disk flange.

8. The hose connecting device of claim 1, wherein the hose receiving section is a reformed part produced without cutting.

9. The hose connecting device of claim 1, wherein the slit is configured in a radially continuous manner and is open on its radially inner side.

10. The hose connecting device of claim 1, wherein the slit is closed on its radially inner side by a bottom.

11. The hose connecting device of claim 1, wherein the holder is comprised of plastic.

12. The hose connecting device of claim 1, wherein the holder comprises a bent sheet metal part.

13. The hose connecting device of claim 1, wherein the retaining limbs include cutout portions for accommodating the tension device.

14. The hose connecting device of claim 1, wherein the tension device comprises a hold clamp.

15. The hose connecting device of claim 1, wherein the tension device comprises a tightening strap.

16. The hose connecting device of claim 15, wherein the tightening strap includes a form-closed tension lock.

17. A hose connecting device suitable for high-pressure applications, the device comprising:
    a hose connecting device element having an extension with a tubular hose receiving section for receiving a hose and a radial projection adjoining the hose receiving section;
    a retainer including at least two retaining limbs extending axially on the outside of the hose in longitudinal direction of the hose, the retaining limbs being connected with each other by a strip supported by the radial projection;
    at least one tension means that encloses a portion of the outside of the hose and the retaining limbs in the radial direction and tensions the retaining limbs with respect to the outside of the hose; and
    a c-shaped holder having resilient limbs, the holder forming an arc of a circle;
    wherein a portion of the hose receiving section includes a hose holding profile on an outer surface of the hose receiving portion, the hose holding profile has at least one annular rib with an edge facing against the hose pull-off direction, the hose receiving section includes at least one annular groove for accommodating a sealing element on an outer surface of the hose receiving section, and wherein, next to the radial projection, a longitudinally-extending groove for the accommodation of the holder is provided, the holder is separate from the retainer and the holder is configured to extend continuously more than 180 degrees around the circumference of the groove, the groove configured to accommodate the strip of the retainer and, in turn, a portion of the retainer being supported by the radial projection; and
    wherein the holder has a slit extending along the holder's circumference, the strip of the retainer being inserted into the slit.

18. A hose connecting device suitable for high-pressure applications, the device comprising:
    a hose connecting device element having an extension with a hose receiving section for receiving a hose and a radial projection adjoining the hose receiving section;

a retainer including at least two retaining limbs extending axially on the outside of the hose in longitudinal direction of the hose, the retaining limbs being connected with each other by a strip supported by the radial projection;

a holder having resilient limbs;

at least one strap or hold clamp that encloses a portion of the outside of the hose and the retaining limbs in the radial direction and secures or tensions the retaining limbs with respect to the outside of the hose;

wherein, next to the radial projection, a longitudinally-extending groove for the accommodation of the holder is provided, the holder is separate from the retainer and the holder is configured to extend continuously more than 180 degrees around the circumference of the groove, the groove configured to accommodate the strip of the retainer and, in turn, a portion of the retainer being supported by the radial projection; and wherein the holder has a slit extending along the holder's circumference, the strip of the retainer being inserted into the slit.

* * * * *